(12) United States Patent
Bogatz et al.

(10) Patent No.: US 11,150,849 B2
(45) Date of Patent: Oct. 19, 2021

(54) DEVICE AND METHOD FOR CHECKING THE PRINTING OF AN ARTICLE

(71) Applicant: PHOENIX CONTACT GmbH & Co. KG, Blomberg (DE)

(72) Inventors: Erik Bogatz, Lemgo (DE); Marcus Niederhöfer, Blomberg (DE); Mattes Reitz, Lemgo (DE)

(73) Assignee: PHOENIX CONTACT GMBH & CO. KG

( * ) Notice: Subject to any disclaimer, the term of this patent is extended or adjusted under 35 U.S.C. 154(b) by 0 days.

(21) Appl. No.: 16/678,774

(22) Filed: Nov. 8, 2019

(65) Prior Publication Data
US 2020/0150909 A1    May 14, 2020

(30) Foreign Application Priority Data

Nov. 9, 2018 (DE) .......................... 102018219169.7

(51) Int. Cl.
*G06F 3/12* (2006.01)
*G06T 7/00* (2017.01)
*H04N 1/00* (2006.01)
*H04N 1/23* (2006.01)

(52) U.S. Cl.
CPC .......... *G06F 3/1208* (2013.01); *G06F 3/1206* (2013.01); *G06F 3/1245* (2013.01); *G06F 3/1246* (2013.01); *G06T 7/001* (2013.01); *G06T 7/97* (2017.01); *H04N 1/00005* (2013.01); *H04N 1/00015* (2013.01); *H04N 1/00031* (2013.01); *H04N 1/00034* (2013.01); *H04N 1/00087* (2013.01); *H04N 1/233* (2013.01); *H04N 1/2323* (2013.01); *G06T 2207/30144* (2013.01)

(58) Field of Classification Search
CPC .......................................... G06F 3/1245–1247
See application file for complete search history.

(56) References Cited

U.S. PATENT DOCUMENTS

| | | | |
|---|---|---|---|
| 7,440,123 B2 * | 10/2008 | Chodagiri | B41F 7/18 358/1.13 |
| 9,007,658 B2 | 4/2015 | Ito | |
| 9,098,794 B2 * | 8/2015 | Braun | G06F 3/1248 |
| 9,146,516 B2 * | 9/2015 | Morishita | G03G 15/55 |

(Continued)

FOREIGN PATENT DOCUMENTS

| | | |
|---|---|---|
| CN | 104677911 A | 6/2015 |
| CN | 106033326 A | 10/2016 |

(Continued)

OTHER PUBLICATIONS

German Office Action dated Jul. 17, 2019.

(Continued)

*Primary Examiner* — Scott A Rogers
(74) *Attorney, Agent, or Firm* — Quarles & Brady LLP

(57) ABSTRACT

The present invention relates to a device (100) for checking printing of an article, the device (100) comprising: data providing device (10) adapted to provide printing data for the article from product data of the article; camera device (20) adapted to receive an image of an article printed by a printing process and to provide it as image data; and a computer device (30) adapted to perform a quality check of the printing process based on a comparison of the printing data with the image data.

13 Claims, 3 Drawing Sheets

(56) References Cited

U.S. PATENT DOCUMENTS

| | | | | |
|---|---|---|---|---|
| 9,213,894 B2* | 12/2015 | Yamagishi | ......... | H04N 1/00047 |
| 10,437,537 B2* | 10/2019 | Matsui | ............... | G06K 15/1809 |
| 2007/0188485 A1* | 8/2007 | Yasukawa | ............. | G06F 3/1234 |
| | | | | 345/419 |
| 2008/0137914 A1* | 6/2008 | Minhas | .............. | H04N 1/00031 |
| | | | | 382/112 |
| 2018/0121141 A1* | 5/2018 | Manabe | ................ | G06F 3/1206 |
| 2018/0227463 A1 | 8/2018 | Kase | | |

FOREIGN PATENT DOCUMENTS

| | | |
|---|---|---|
| CN | 106461574 A | 2/2017 |
| CN | 106881956 A | 6/2017 |
| CN | 107202551 A | 9/2017 |
| CN | 108351755 A | 7/2018 |
| CN | 108437630 A | 8/2018 |
| DE | 102009046594 | 5/2011 |
| DE | 102011075343 | 11/2012 |
| JP | 2017-164935 | 9/2017 |
| WO | 2010149453 | 12/2010 |

OTHER PUBLICATIONS

Extended European Search Report dated Feb. 11, 2019.
China National Intellectual Property Administration. First office action for application 201911093405.3, dated Apr. 27, 2021. With translation.
European Patent Office. Office Action for application 18205470.0, dated May 17, 2021. With translation.

* cited by examiner

```
<plug connector>
<\plug connector>
<1>
<2>
<3>
```

Fig. 3

DEVICE AND METHOD FOR CHECKING THE PRINTING OF AN ARTICLE

CROSS REFERENCE TO RELATED APPLICATIONS

This application claims the benefit of German Patent Application No. DE 10 2018 219 169.7 filed on Nov. 9, 2018, the entire contents of which are incorporated herein by reference.

TECHNICAL FIELD

The present invention relates to systems for the verification of printing processes.

In particular, present invention relates to a device and a method for checking the printing of or on an article.

TECHNICAL BACKGROUND

The optical printing process verification of freely configurable articles cannot fall back on databases of photographs of a standard-compliant and quality standard corresponding printing of articles.

An article can often be printed on a new, individually configured article which has not yet been produced or only rarely produced and for which therefore no image data is available for successful printing in accordance with quality standards.

Manual teach-in processes or conventional production control with optical systems and imaging procedures as well as automatic optical inspection procedures based on such image databases with a large number of images of correctly performed printing processes are therefore often not possible for freely configurable articles and fail due to the availability of corresponding learning data and image databases.

SUMMARY OF THE INVENTION

It is an object of the present invention to provide an improved device and method for testing a printing of an article.

This problem is solved by the objects of the independent patent claims. Further examples and embodiments can be found in the dependent patent claims, the description and the figures of the drawings.

A first aspect of the present invention relates to an apparatus for testing the printing on an article, the apparatus comprising a data providing device, a camera device and a computer device.

The data providing device is adapted to provide printing data for the article based on product data of the article.

The camera device is adapted to receive an image of an article printed by a printing process and to provide the image as image data. The image of the printed article is digitized by means of an electronic image converter or image sensor and provided in the form of image data.

The computer device is adapted to perform a quality check of the printing process based on a comparison of the printing data with the image data provided. The computer device is adapted to perform automatic optical inspection procedures for the correct printing of the article.

The present invention advantageously provides to monitor the printing of a product on the basis of product data for a customer-specific composite product on the basis of predicted properties, without requiring learning data from previously performed and previously recorded printing.

The reliability of monitoring the printing process can thus be increased. Control units can reliably detect a printing error without ever having printed on the printed article beforehand.

This offers a monitoring function for the printing process that allows process control of the printing of newly created articles using the configurator or variant configurator, especially in the area of freely configurable and customer-specific products.

The present invention enables a quality check of the printing and a quality check of further article properties, whereby required information is derived, for example, from product data available in a neutral format or neutral data format. This makes it possible to test newly created articles without a manual teach-in process of the test system. In other words, the present invention involves that no prototypes of the article are required, which are only used to obtain a reference image of a correctly printed article.

Advantageous embodiments of the present invention are defined in the dependent claims.

As mentioned above, the data providing device is adapted to provide printing data for the article based on product data of the article. The provision of printing data may comprise the provision of article-specific printing data and may be performed, for example, in partially or fully automated processes and in particular by partially or fully computer-aided processes.

In other words, for example, the printing data is extracted automatically from the product data, implying that the product data is adapted by a data extraction and transformation process using a data processing entity like a processor.

The providing of printing data for the article based on the product data includes, for example, data extraction, which extracts printing data from the product data partially or fully automatically.

For example, a computer-aided data transformation takes place, which changes the product data through data cleansing and transforms the changed product data into a suitable storage format/structure for printing into printing data.

Providing the printing data for the article from the product data includes, for example, checking the data quality and data consistency standards of the printing data.

The present invention enables customized printing of a customer-specific and freely configured article, of which only product data is known.

For example, the product data is stored in a neutral format, also known as a neutral data format, and the neutral format describes and defines the article and its customer configuration, for example, without going into a specific (production) system or manufacturing process used to manufacture the article.

The neutral data contains, for example, information about the dimensions, such as the height, width, depth of the article or a position of the printing surfaces and cable entry openings of the article, or positions of the screws or the pitch dimension of the article.

The provision of printing data for the article based on the product data includes, for example, details and information about the text to be printed, the font and size, the foreground and background color or the position of the individual characters in relation to a reference point (e.g. lower left corner) of the article.

In an advantageous embodiment of the present invention, it is intended that the computer device is trained to provide a virtual image of the article based on the printing data for the quality examination of the printing process and to compare the virtual image of the article with the image of the article taken up by the camera equipment. This allows to control the printing process of freely configurable articles, be it limited configurable or unlimited configurable articles, and to check the printing during a new production of an article without needing a multitude of reference images, which map a correct print image on model articles.

In an advantageous embodiment of the present invention, it is provided that the computer device is adapted to create a virtual image of the article based on the printing data for the quality check of the printing process and to compare the virtual image of the article with the image of the article taken by the camera device. This enables the user to control the printing process of freely configurable articles, be it limited configurable or unlimited configurable articles, and to check the printing even during a new production of an article without the need for a large number of reference images that map a correct print image onto model articles.

In an advantageous embodiment of this invention, the product data is provided in a neutral data format or neutral format.

In an advantageous embodiment of the present invention, it is intended that the neutral data format be
  (i) an XML format; and/or
  (ii) a platform-independent data format; and/or
  (iii) an implementation-independent data format; and/or
  (iv) a M2M data format An M2M data format, also known as a "machine-to-machine data format", is data stored in a format that enables direct communication between two machines or data processing equipment, i.e. without any human intervention to start, execute or monitor process steps.

In an advantageous embodiment of the present invention, it is provided that the data providing device is configured to be coupled with a printing device used for the printing process and to receive and provide from the printing device machine-specific printing data and/or printing process-specific printing data. This advantageously enables the predictive printing process control to be adapted to the respective printing machine and/or printing process used.

In an advantageous embodiment of the present invention, it is provided that the computer device is configured to further carry out the quality check of the printing process on the basis of a comparison of the received machine-specific printing data and/or the received printing process-specific printing data with the image data. This advantageously enables the predictive printing process control to be adapted to the printing machine and/or printing process used in each case.

In an advantageous embodiment of the present invention, it is provided that the computer device is configured to carry out a quality check of article properties of the article based on a comparison of the printing data with the image data.

In a second aspect of the present invention, a method for checking the printing of an article is provided, the method comprising the following method steps:

As a first process step, printing data for the article is provided from product data of the article by means of a data providing device. Optionally, the product data are available in a neutral data format.

As a second process step, an image of an article, on which a printing process was conducted, is recorded by means of a camera device and image data based on the recorded image is provided by means of the camera device.

As a third process step, a quality check of the printing process is carried out based on a comparison of the printing data with the image data by means of a computer device.

In an advantageous embodiment of the present invention, the method further comprises the following steps:
  creating a virtual image of said article based on said printing data by said computer device; and
  comparing the virtual image of the article with the image taken by the camera equipment by means of the computer device.

In an advantageous embodiment of the present invention, it is provided that the method provides printing data in the neutral data format and the neutral data format is
  (i) an XML format; and/or
  (ii) a platform-independent data format; and/or
  (iii) an implementation-independent data format; and/or
  (iv) a M2M data format In an advantageous embodiment of the present invention, it is provided that the procedure may also include the following procedural steps:
  receiving machine-specific printing data and/or printing process-specific printing data from a printing machine used for the printing process; and
  providing of the machine-specific printing data and/or printing process-specific printing data received by the printing device.

In an advantageous embodiment of the present invention, it is provided that the method may also include the following procedural steps:
  receiving machine-specific printing data and/or printing process-specific printing data from a printing machine used for the printing process; and
  providing of the machine-specific printing data and/or printing process-specific printing data received by the printing device.

In an advantageous embodiment of the present invention, it is provided that the method further comprises the following procedural steps:
  performing the quality check of the printing process further based on a comparison of the received machine-specific printing data and/or the received printing process-specific printing data with the image data recorded by the camera.

In an advantageous embodiment of the present invention, the method further comprises the following steps:
  reading out work steps to be carried out in the printing process from the product data of the article by means of the data providing device; and
  Limiting the quality inspection of the printing process to the work steps to be carried out using the computer device.

After a third aspect, the present invention comprises a data structure format which comprises product data of the article present in a neutral data format and which is adapted to be used by a method of testing a printing of an article according to the second aspect or any form of execution of the second aspect.

The described embodiments with regard to apparatus and methods can be combined in any way.

Further possible arrangements, embodiments, and implementations of the present invention also include combinations of features of the present invention described before or in the following with regard to the forms of execution, which are not explicitly mentioned.

The enclosed drawings are intended to convey a further understanding of the embodiments of the present invention.

The enclosed drawings illustrate embodiments of the present invention and serve in connection with the description for the explanation of concepts of the present invention.

The drawings are not necessarily to scale, emphasis instead generally being placed upon illustrating the principles of the invention.

BRIEF DESCRIPTION OF THE FIGURES

FIG. 3: shows a schematic representation of a data structure for checking the printing of an article according to an embodiment example of the present invention.

DETAILED DESCRIPTION OF EMBODIMENTS

Figure 1:
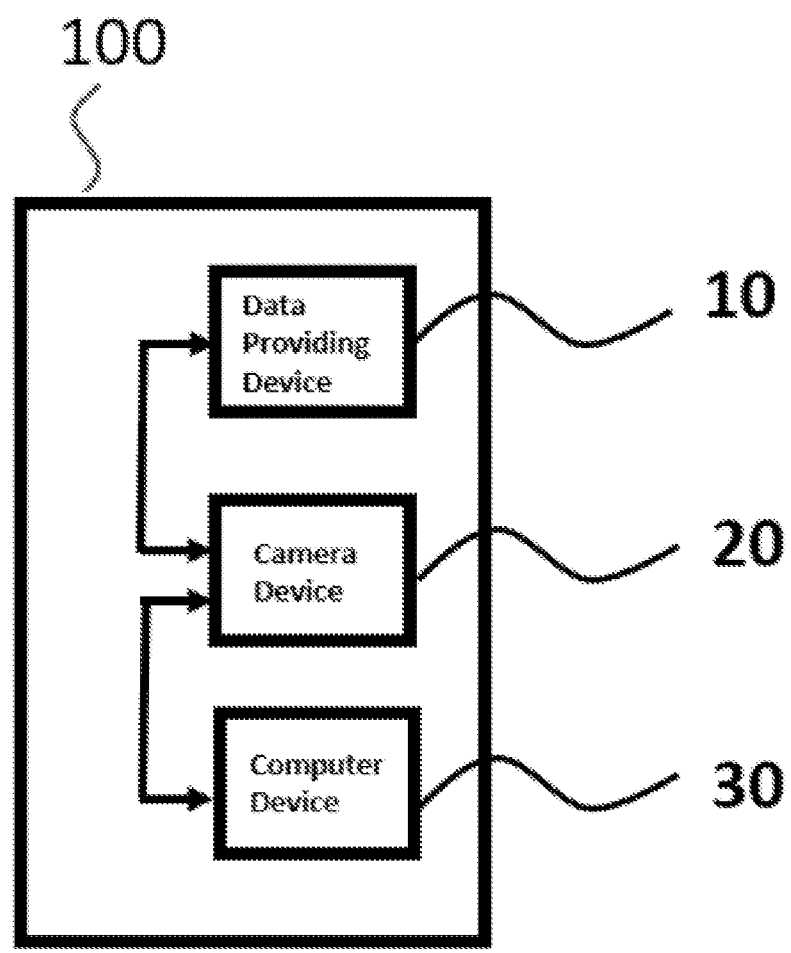
FIG. 1: shows a schematic representation of a device for testing an imprint on an article in accordance with an embodiment of the present invention.

In the figures in the drawings, identical reference symbols denote identical or functionally identical elements, components, parts or process steps, unless otherwise indicated.

The term "neutral data format" as used by the present invention includes, for example, data or file formats for a neutral file exchange between units, such as computers, of a computer network.

The term "neutral data format" as used by the present invention may be understood, for example, as an intermediate file format to translate data between participating systems of the computer network, such as production systems or ordering systems —web shop—or internal data processing systems—backend.

In other words, a neutral file is generated from original data in other file formats. However, the target system can read and process the neutral file unlike the original data.

The term "product data", in particular product data of the article as used by the present invention, describes, for example, data that defines and classifies an article, in particular according to customer-specific configuration. In other words, the product data describes and identifies parameters, properties, and execution options of the article.

The term "printing data", in particular printing data of the article as used by the present invention, describes, for example, data that defines and classifies any printing process to be performed on the article, in particular according to article-specific configuration. In other words, the printing data describes and identifies parameters and properties of any printed matter on the article.

FIG. 1 shows a schematic representation of a device for checking the printing of an article according to an embodiment of the present invention.

The device 100 comprises a data providing device 10, a camera device 20 and a computer device 30.

The data providing device 10 is adapted to provide printing data for the article from product data of the article.

The camera device 20 is adapted to receive an image of an article printed by a printing process and to provide it as image data.

The computer device 30 is adapted to perform a quality check of the printing process based on a comparison of the printing data with the image data.

The data providing device 10 is adapted to provide printing data for the article based on product data of the article. The data providing device 10 may be adapted to provide the printing data in terms of article-specific printing data, the data providing device 10 may be adapted to perform the providing of the printing data in partially or fully automated processes and in particular by partially or fully computer-aided processes.

In other words, for example, the printing data is extracted by the data providing device 10 automatically from the product data. The data providing device 10 may be adapted to transform the product data by a data extraction and transformation process using a data processing entity like a processor.

The data providing device 10 may be adapted to perform data extraction, which extracts printing data from the product data.

The data providing device 10 may be adapted to perform a computer-aided data transformation, which changes the product data through data cleansing and which transforms the changed product data into a suitable storage format/structure for the printing process into printing data.

The data providing device 10 may be adapted to a checking of the data quality and data consistency standards of the printing data.

The present method enables the printing process control of freely configurable articles. The device can be coupled with computer-aided product manufacturing systems or a process structure for product manufacturing and Internet-based product configuration systems and can provide autonomous and adaptable verification systems via M2M communication.

Figure 2:
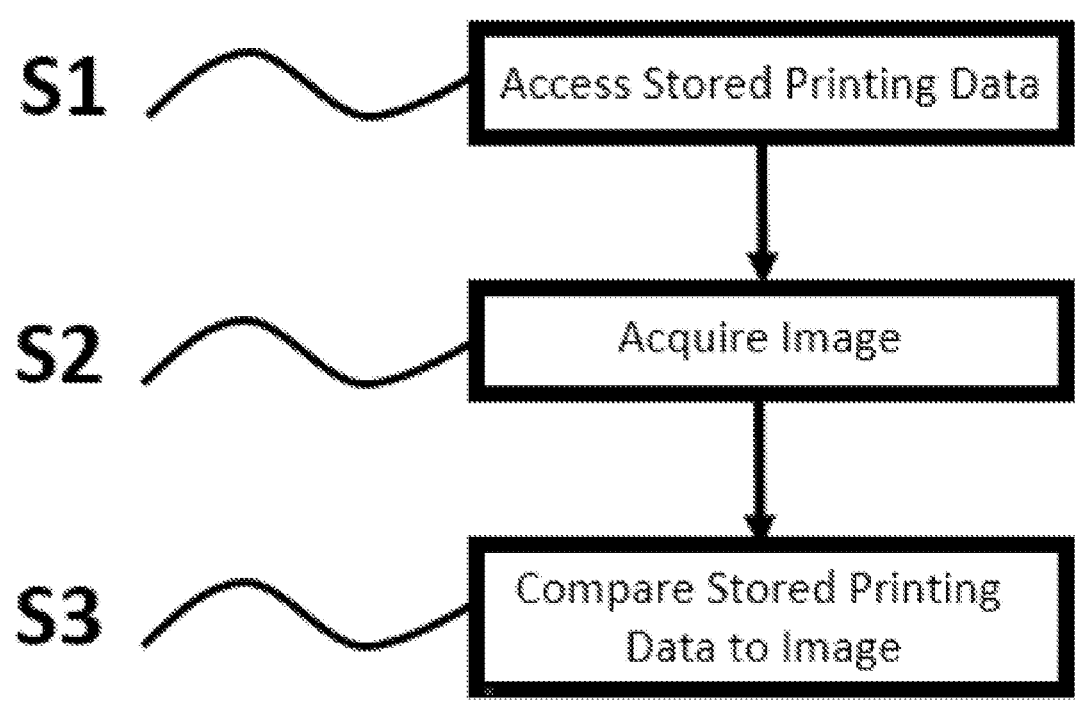
FIG. 2: shows a schematic representation of a flowchart of a method for testing a printing of an article according to an embodiment of the present invention.

FIG. 2 shows a schematic representation of a flow diagram of a method for checking the printing of an article according to an example or embodiment of the present invention.

As a first process step, S1 of printing data for the article is provided from product data of the article by means of a data providing device. Optionally, the product data are stored in a neutral data format.

The neutral data format can, for example, be an XML format, a platform-independent data format, an implementation-independent data format or an M2M data format.

As a second process step, an S2 image of an article is captured of printed, by means of a printing process, article, the image captured by a camera device and, further, image data based on the captured image is provided by the camera device.

As a third step, S3 a quality check of the printing process is performed based on a comparison of the printing data with the image data by means of a computer device.

Figure 3:
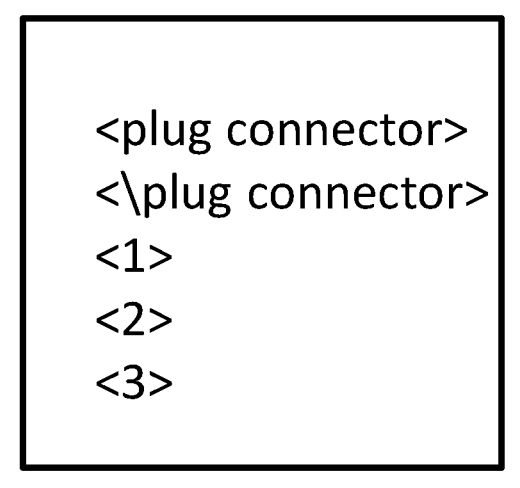

FIG. 3 shows a schematic representation of a data structure for checking the printing of an article according to an embodiment or an example of the present invention.

The data structure format shown in FIG. 3 may include product data of the article in a neutral data format. In addition, the data structure format may be configured to be used by a process to verify the printing of an article.

Furthermore, in the data structure format presented, the neutral data format may include (i) an XML format; and/or
(ii) a platform-independent data format; and/or
(iii) an implementation-independent data format; and/or
(iv) a M2M data format.

The data structure format can include hierarchically structured product data in the format of a text file.

Although the present invention has been described above using preferred examples or embodiments, it is not limited to this, but can be modified in many ways. In particular, the present invention can be altered or modified in many ways without deviating from the core of the invention.

In addition, it should be noted that "comprising" and "having" do not exclude any other elements or steps and "one" or "one" do not exclude any multiplicity.

It should also be noted that features or steps described with reference to any of the above examples may also be used in combination with other features or steps of other examples of execution described above. Reference signs in the claims should not be regarded as a restriction.

The invention claimed is:

1. An apparatus for inspecting a printing of an article, the apparatus comprising:
    a data providing device adapted to provide printing data for the printing of the article, wherein the printing data is based on product data of the article;
    a camera device adapted to capture an image of an article printed by a printing process and to provide it as image data; and
    a computer device adapted to perform a quality check of the printing process based on a comparison of the printing data with the image data, wherein the computer device is adapted to create a virtual image of the article based on the printing data and to compare the virtual image with the image of the article captured by the camera device.

2. The apparatus according to claim 1, wherein the printing data is separate and distinct from the product data, and wherein the data providing device is adapted to provide the printing data for the article from the product data of the article as present in a neutral data format, the neutral data format comprising at least one of the following:
    (i) an XML format; and/or
    (ii) a platform-independent data format; and/or
    (iii) an implementation-independent data format; and/or
    (iv) an M2M data format.

3. The apparatus according to claim 1, wherein the data providing device is adapted to couple to a printing machine, and
    wherein to provide the printing data, the data providing device is adapted to receive and provide from the printing machine machine-specific printing data and/or printing process-specific printing data.

4. The apparatus according to claim 3, wherein to perform the quality check of the printing process, the computer device is adapted to compare the received machine-specific printing data and/or the received printing process-specific printing data with the image data.

5. The apparatus according to claim 1,
    wherein the data providing device is further adapted to provide, based at least in part on the product data of the article, a set of working steps corresponding to the printing process; and
    wherein the computer device is adapted to apply the set of working steps when performing the quality check of the printing process.

6. The apparatus according to claim 1, wherein the computer device is adapted to perform a quality check of article characteristics of the article based on a comparison of the printing data with the image data.

7. A method for checking a printing of an article, the method comprising:
    providing printing data for the printing of the article, wherein the printing data is based on product data of the article;
    recording, by a camera device, an image of an article printed by a printing process and providing image data based on the recorded image by said camera device; and
    performing a quality check of the printing process based on a comparison of the printing data with the image data by a computer device by:
        generating a virtual image of said article based on said printing data by said computer device; and
        comparing the virtual image with the image of the article taken by the camera device using the computer device.

8. The method according to claim 7, wherein the printing data for the article is provided from the product data of the article present in a neutral data format; and
    the neutral data format being at least one of the following:
    (i) an XML format; and/or
    (ii) a platform-independent data format; and/or
    (iii) an implementation-independent data format; and/or
    (iv) an M2M data format.

9. The method according to claim 7, wherein providing the printing data for the article comprises:
    receiving press specific printing data and/or printing process specific printing data from a printing machine used for the printing process; and
    providing the press specific printing data and/or the printing process specific printing data received from the printing device.

10. The method according to claim 9, wherein the method further comprises the following steps:
    performing the quality check of the printing process further based on a comparison of the received machine-specific printing data and/or the received printing process-specific printing data, characterized in that the quality check of the printing process is performed on the basis of a comparison of the received machine-specific printing data and/or the received printing process-specific printing data.

11. The method according to claim 7, wherein the method further comprises:
    providing, based at least in part on the product data of the article, a set of operations corresponding to the printing process; and
    limiting the quality check of the printing process to the set of operations corresponding to the printing process.

12. A system comprising:
    a computer device adapted to:
        receive image data of an article printed by a printing process;
        determine printing data for the article, wherein the printing data is based on product data of the article;
        create a virtual image of the article based on the printing data; and
        perform a quality check of the printing process based on a comparison of the the created virtual image with the image data of the article printed by the printing process, wherein the product data of the article present is accessed by the computer device in a neutral data format.

13. The system of claim 12, wherein the neutral data format comprises at least one of the following:
    (i) an XML format; and/or
    (ii) a platform-independent data format; and/or
    (iii) an implementation-independent data format; and/or
    (iv) an M2M data format.

* * * * *